US008037534B2

(12) United States Patent
Smith et al.

(10) Patent No.: US 8,037,534 B2
(45) Date of Patent: Oct. 11, 2011

(54) STRATEGIES FOR ENSURING THAT EXECUTABLE CONTENT CONFORMS TO PREDETERMINED PATTERNS OF BEHAVIOR ("INVERSE VIRUS CHECKING")

(76) Inventors: Joseph B. Smith, Redmond, WA (US); John T. Spivey, Redmond, WA (US); Cesare J. Saretto, Seattle, WA (US)

( * ) Notice: Subject to any disclaimer, the term of this patent is extended or adjusted under 35 U.S.C. 154(b) by 1959 days.

(21) Appl. No.: 11/069,797

(22) Filed: Feb. 28, 2005

(65) Prior Publication Data
US 2006/0195451 A1 Aug. 31, 2006

(51) Int. Cl.
*G06F 12/14* (2006.01)
*G06F 7/04* (2006.01)
*H04L 29/06* (2006.01)
*H04L 9/00* (2006.01)

(52) U.S. Cl. .......... 726/24; 726/2; 726/3; 726/4; 726/6; 726/22; 726/23; 726/30; 726/34; 713/154; 713/165; 713/171; 713/188; 380/277

(58) Field of Classification Search ............ 726/24, 726/22, 26; 713/165; 380/277
See application file for complete search history.

(56) References Cited

U.S. PATENT DOCUMENTS

| 5,440,723 | A  | * | 8/1995  | Arnold et al. ........... 714/2   |
|-----------|----|---|---------|----------------------------------|
| 5,485,575 | A  | * | 1/1996  | Chess et al. ............ 714/38  |
| 5,948,104 | A  | * | 9/1999  | Gluck et al. ............ 726/24  |
| 5,960,170 | A  | * | 9/1999  | Chen et al. ............ 714/38   |
| 6,314,514 | B1 | * | 11/2001 | McDonald ............ 712/239     |
| 6,571,338 | B1 | * | 5/2003  | Shaio et al. ............ 726/13  |
| 6,694,434 | B1 | * | 2/2004  | McGee et al. ......... 713/189    |
| 7,325,249 | B2 | * | 1/2008  | Sutton et al. ......... 726/13    |
| 7,406,501 | B2 | * | 7/2008  | Szeto et al. .......... 709/206   |
| 7,596,599 | B1 | * | 9/2009  | Maghsoodnia et al. .... 709/206   |
| 2002/0016925 | A1 | * | 2/2002 | Pennec et al. ......... 713/201 |
| 2003/0070087 | A1 | * | 4/2003 | Gryaznov ............. 713/201  |
| 2004/0003284 | A1 | * | 1/2004 | Campbell et al. ....... 713/201 |
| 2005/0022016 | A1 | * | 1/2005 | Shipp ................ 713/201   |
| 2006/0168545 | A1 | * | 7/2006 | Niittynen et al. ....... 715/848 |
| 2007/0168863 | A1 | * | 7/2007 | Blattner et al. ........ 715/706 |
| 2007/0220608 | A1 | * | 9/2007 | Lahti et al. .......... 726/24  |
| 2008/0209562 | A1 | * | 8/2008 | Szor ................ 726/24     |

OTHER PUBLICATIONS

John K. Ousterhout, "Scripting: Higher Level Programming for the 21st Century," available at << http://www.tcl.tk/doc/scripting.html>>, accessed on Nov. 8, 2005, 12 pages.

Derek Franklin et al., "Macromedia Flash MX 2004 ActionScript : Training from the Source," Macromedia Press, 2003, Chapter 1, also available at << http://www.macromedia.com/devnet/flash/articles/astfts_excerpt/astfts_lesso1.pdf>>, accessed on Nov. 8, 2005, 28 pages.

Macromedia homepage, provided by Macromedia Inc. of San Francisco, CA, available at <<http://www.macromedia.com/macromedia/contact/>>, accessed on Nov. 8, 2005, 5 pages.

MSN Messenger homepage, provided by Microsoft Corporation of Redmond, WA, available at <<http://messenger.msn.com/Xp/Default.aspx>>, accessed on Nov. 8, 2005, 2 pages.

(Continued)

*Primary Examiner* — Edan Orgad
*Assistant Examiner* — Jenise E Jackson
(74) *Attorney, Agent, or Firm* — Lee & Hayes, PLLC

(57) ABSTRACT

Security provisions are described which determine whether or not executable content is likely to perform undesirable actions. The security provisions assess that an executable content item poses an acceptable risk when it conforms to an allow list of predetermined patterns of permissible behavior. The security provisions find exemplary use in the context of an instant messaging environment, where participants can consume and propagate executable content in the course of conducting a communication session. Supplemental rules are described which prevent malicious code from subverting the allow list design paradigm.

19 Claims, 9 Drawing Sheets

OTHER PUBLICATIONS

Yahoo! Messenger homepage, provided by Yahoo! of Sunnyvale, CA; available at << http://messenger.yahoo.com/?ovchn=GGL&ovcpn=US_Can_Branded-Generic&ovcrn=yahoo+messenger&ovtac=PPC>>, accessed on Nov. 8, 2005, 2 pages.

AOL Instant Messenger homepage, provided by America Online of Dulles, VA, available at <<http://www.aim.com/>>, accessed on Nov. 8, 2005, 1 page.

* cited by examiner

Scenario A

1 Push "B"          stack: [B]
2 Push "ad"         stack: [B  ad]
3 AddString         stack: [Bad]
4 CallMethod        stack: [Bad]

Scenario B

1 Push "Bad"        stack: [Bad]
2 Jmp4              stack: [Bad] (skips to step 3 below upon execution
3 Push "Good"       stack: [Good]
4 CallMethod        stack: [Bad]

Scenario C

1 ActionPush "Good"   stack: [Good]
2 GetVariable         (this allows a function called "Good" to be treated as a variable)
3 ActionPush "Bad"    stack: [Bad]
4 SetVariable         (now Good = Bad)
5 ActionPush "Good"   stack: [Good]
6 CallMethod          (actually calls the "Bad" function since Good == Bad)

Fig. 6

STRATEGIES FOR ENSURING THAT EXECUTABLE CONTENT CONFORMS TO PREDETERMINED PATTERNS OF BEHAVIOR ("INVERSE VIRUS CHECKING")

TECHNICAL FIELD

This subject matter relates to strategies for reducing the risk that executable content will cause undesirable actions. In a more specific exemplary implementation, this subject matter relates to strategies for ensuring that executable content used in the context of an instant messenger application will not cause undesirable actions.

BACKGROUND

An instant messenger (IM) application enables real time communication among online participants. By way of background, an IM application typically includes functionality for allowing an IM user to define a group of participants with whom the user frequently communicates. After defining such a group, the IM application typically notifies the IM user when any member of the group happens to be online. The IM user then has the option of starting a communication session with one or more members of the group. Or the IM user might be contacted by another member who happens to be online. These events prompt the IM application to open a user interface (UI) pane that presents an evolving sequence of textual messages transmitted among IM conversation participants.

FIG. 1 shows an overview of a representative IM system 100. The system 100 includes a collection of client devices (102, 104, . . . 106) connected together via a coupling mechanism 108 (e.g., the Internet). A user Alice (A) operates client device A 102, a user Bob (B) operates client device B 104, and a user Carol (C) operates client device C 106. FIG. 1 shows that client device A 102 provides a conventional user interface pane 110. The user interface pane 110 identifies Alice's "buddies" in a contact list 112, and also identifies whether these buddies happen to be currently online. Assume that Bob and Carol are two members of Alice's contact list 112 who happen to be currently online.

In recent years, providers of IM applications have attempted to provide a more engaging user experience by adding supplemental features to the above-described basic IM functionality. For instance, Microsoft Corporation of Redmond, Wash. has developed an MSN Messenger application that includes various features that exhibit dynamic behavior (such as Messenger's "Winks" feature, etc.). These features may provide an animated vignette for presentation in an IM pane, or other kind of non-static presentation. To achieve this dynamic behavior, such content may contain executable instructions that command the client device to perform operations during runtime. Such content can be implemented in various ways, such as by Flash-based technology developed by Macromedia, Inc. of San Francisco, Calif. Flash movies contain vector-based animation graphics, and may contain script-type instructions (e.g., Macromedia's ActionScript) embedded therein.

However, the incorporation of executable content into an IM application also introduces significant challenges. Namely, there is a risk that a user (or some other entity) may intentionally or unintentionally introduce malicious content into an IM system. For example, instead of merely controlling the presentation aspects of an IM feature, the dynamic component of malicious content may improperly access files, install unwanted code, destroy system resources, activate unwanted user interface presentations, activate webcam or spyware functionality, present unsolicited advertising material, and so forth. Such malicious content may therefore cause great disruption and damage within an IM system, detracting from the otherwise engaging and desirable nature of dynamic IM presentations.

Indeed, while the threat of computer viruses poses a pernicious problem in any computer environment, the consequences of such viruses in an IM system may be particularly severe. This is principally due to the automatic manner in which IM applications propagate information among participants. For example, the propagation of a virus via an Email application often depends on a user taking the express step of activating executable content that accompanies the Email as an attachment. In IM applications, however, it is often desirable to automatically execute such content without the user's approval. A network of interrelated contacts groups might therefore constitute a very susceptible conduit for the rapid spread of malicious content.

Consider, for example, the case in which Alice uses her client device A 102 to retrieve content 114 that happens to have a virus. For example, assume that Alice visits a website that provides a library of animated icons supplied by a content provider. Assume that Alice selects one of these animated icons and downloads it to her local client device A 102 for use in communicating with her buddies. For instance, Alice can adopt the downloaded animated icon as an integral part of the set of information that she provides to her buddies when communicating with them, e.g., such that, for instance, Bob will see Alice's animated icon when conducting an IM session with Alice. However, transfer of the animated icon will also transfer the virus along with it. Bob himself may then further propagate the virus to the members on his contact list, and so on. The reader can readily appreciate that an IM application can therefore rapidly spread a virus through a very large pool of IM users.

The industry has provided numerous tools to reduce the risk of computer viruses. The system 200 shown in FIG. 2 uses an approach that can be said to roughly mirror the way an animal's immune system deals with biological viruses. Namely, the system 200 first identifies the nature of potential viruses in its environments. The system 200 then uses this knowledge as a key to identify the presence of viruses in a content item under review. Upon finding a match between a known virus and a content item under review, the system 200 can quarantine this content item to prevent it from causing damage to system resources and/or from propagating to other systems. Or, if possible, the system 200 can remove a suspect part of the content item, and thereby sanitize it.

To operate in the manner described above, the system 200 requires advance knowledge of the types of threats facing a community of computer users. A virus registration system 202 performs this role. The virus registration system 202 loosely represents an organized approach and accompanying functionality for detecting and registering known malicious content. More formally, the virus registration system 202 monitors a large collection of content 204 for the presence of confirmed malicious content 206, and then registers the malicious content in a malicious content store 208. The monitoring performed by the registration system 202 can take the form of automated and/or manual analysis that detects the presence of malicious content. The effective detection of malicious content also relies on reports sent to the virus registration system 202 by end-users who independently detect viruses in their own systems. McAfee, Inc. of Santa Clara, Calif. is one well-known provider of virus protection services that maintains a large database of known malicious content.

A conventional virus checker 210 applies the knowledge gleaned by the virus registration system 202 to determine whether a particular content item 212 contains objectionable content. Namely, the virus checker 210 employs a virus scanning module 214 which scans the received content 212 to determine whether it contains any of the content registered in the malicious content store 208. The virus checker 210 can quarantine or sanitize content 212 that is identified as potentially unsafe.

As appreciated by the present inventors, services of the type described in FIG. 2 are not well-suited for safeguarding the consumption and propagation of executable content in an IM application. This is because the body of malicious content constantly changes in response to the introduction of new forms of viruses into the pool of possible content permutations 204. Thus, a consumer may encounter a virus before the virus registration system 202 has properly identified the virus and added it to the known malicious content store 208. Since the consumer lacks safeguards against this new virus, the consumer may consume the virus, opening the consumer's computer resources up to whatever damage that the virus may inflict. The system 200 copes with this problem by acting as quickly as possible to stem the further spread of such a virus. This approach—which implicitly accepts a limited amount of damage—may work sufficiently well in the context of conventional communication routes (such as Email). But, as explained above, an IM application is unique in its potential ability to very quickly propagate malicious content among users (without even requiring the active participation of the users). Hence, the "acceptable limited damage" paradigm might not provide satisfactory results for an IM environment, because, in fact, the damage may be neither acceptable nor limited.

For at least the above-identified reasons, there is an exemplary need for more satisfactory strategies for ensuring that executable content will not cause undesirable actions in IM and other applications.

SUMMARY

According to one exemplary implementation, a method is described for reducing the risk that executable content performs undesirable actions. The method comprises: (a) receiving executable content; and (b) determining, with reference to a knowledge base of predetermined permissible patterns of behavior, whether the executable content is unlikely to perform undesirable actions.

According to another exemplary feature, the executable content comprises instructions expressed in a script-based language.

According to another exemplary feature, the executable content comprises a program for execution in the context of an instant messaging application.

According to another exemplary feature, the determining is performed at a client device prior to execution of the executable content by the client device.

According to another exemplary feature, the determining is performed by a code checking entity that is remote from a client device, on behalf of the client device which will execute the executable content.

According to another exemplary feature, the determining comprises parsing the executable content into examinable elements, and determining whether each examinable element is unlikely to perform undesirable actions.

According to another exemplary feature, the executable content contains sequential instructions, and wherein the determining comprises ascertaining whether the sequential instructions satisfy prescribed rules.

According to another exemplary feature, one of the prescribed rules mandate that a method call command must be preceded by a stack push command.

According to another exemplary feature, one of the prescribed rules mandates that no branching command can branch to a method call command.

According to another exemplary feature, one of the prescribed rules mandates that a variable cannot be defined as an entry in the predetermined permissible patterns of behavior.

Additional exemplary implementations are described in the following.

BRIEF DESCRIPTION OF THE DRAWINGS

FIG. 6 shows different exemplary rules that can be applied by the conformance-checking functionality of FIGS. 4 and 5.

Figure 1:
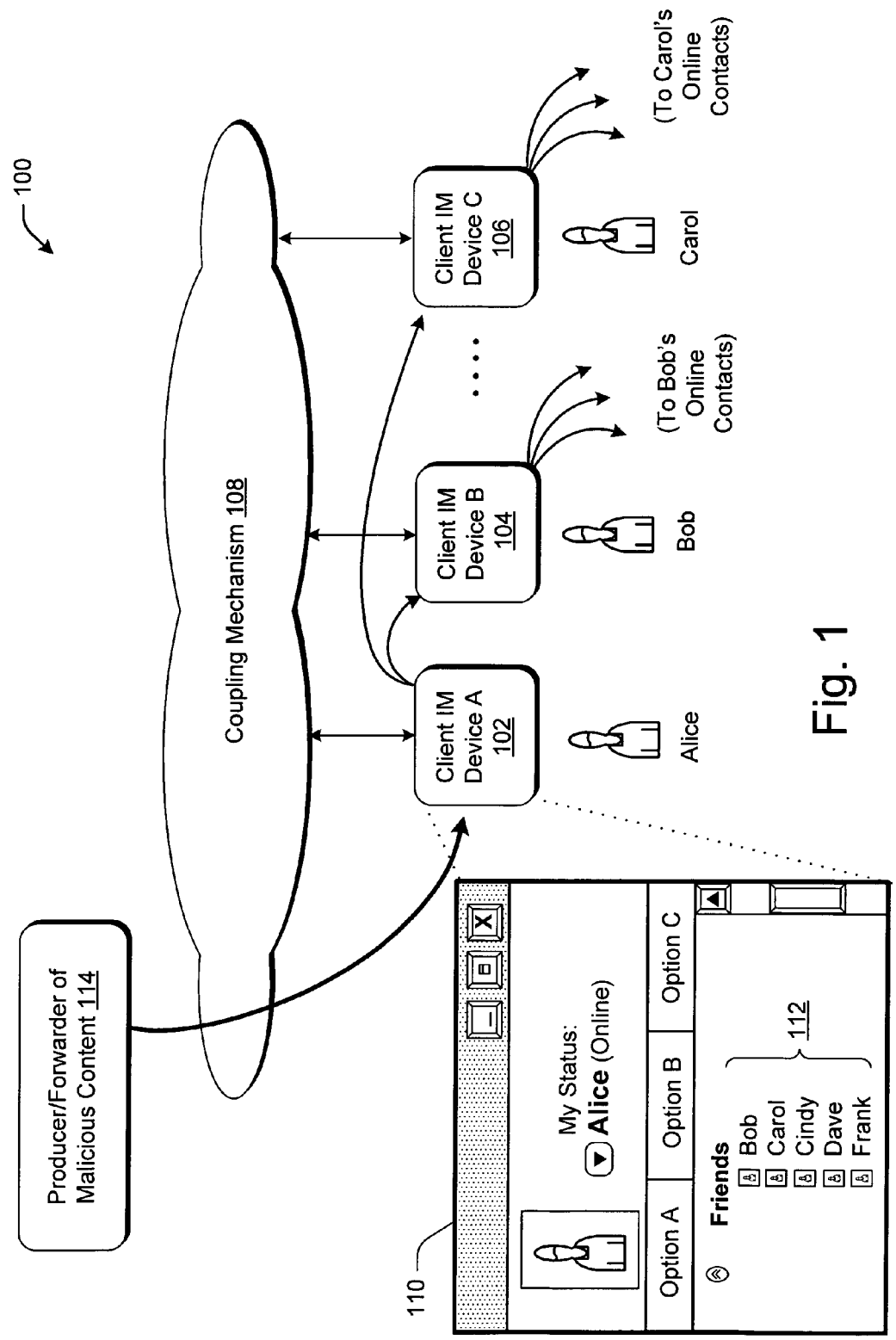
FIG. 1 shows a conventional IM application.
Figure 2:
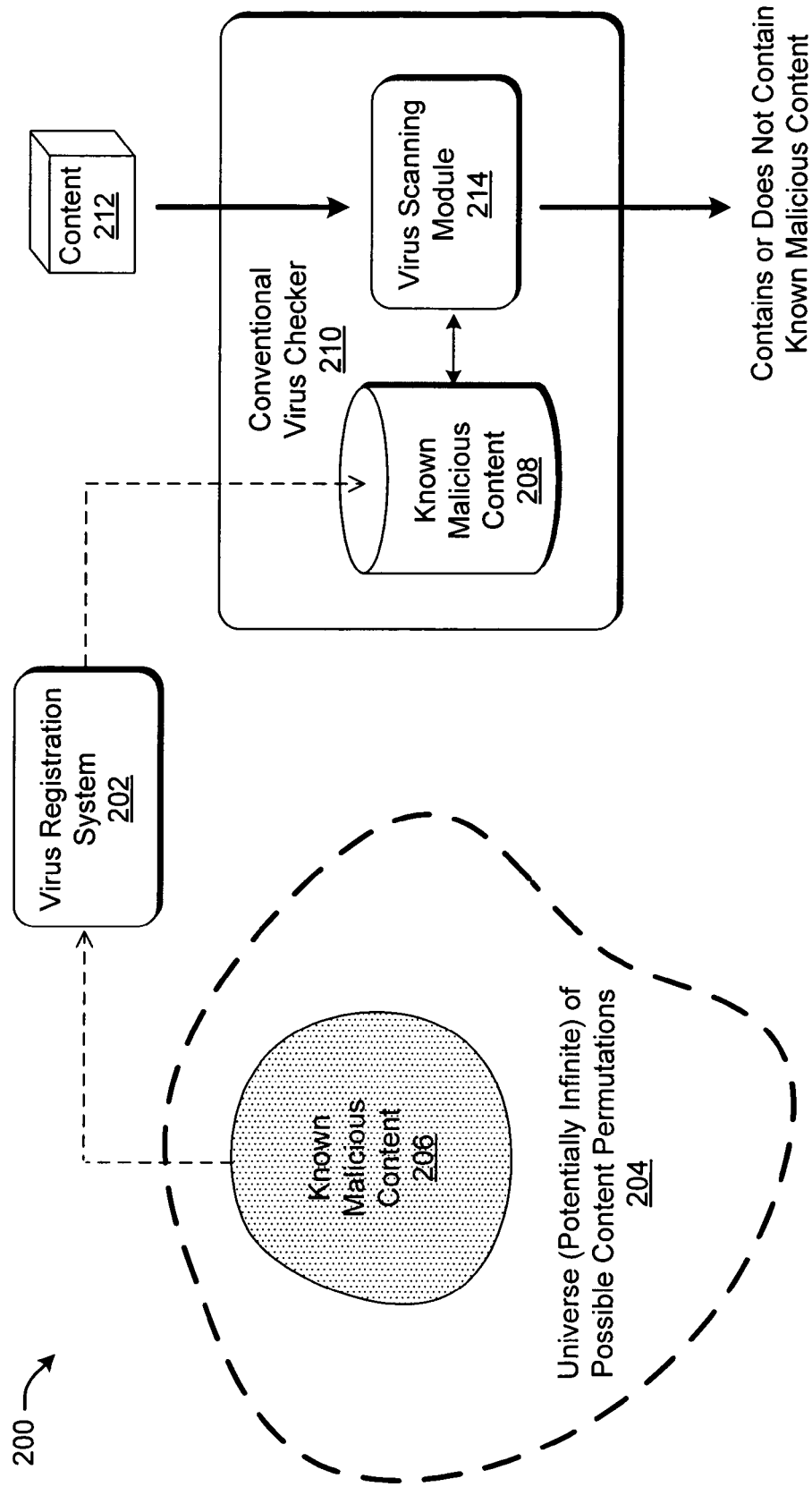
FIG. 2 shows a conventional virus-checking mechanism.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for ensuring that executable content conforms to predetermined patterns of behavior. That is, instead of forming a knowledge base of possible malicious content, the present approach forms a knowledge base of permitted patterns of behavior (also referred to herein as an "allow list"). An executable content item is assessed as presenting an acceptable level of risk when it conforms to one or more of the permitted patterns of behavior. If the executable content item fails to match the predetermined patterns of behavior then it is deemed potentially unsafe, without necessarily identifying the specific identity of the viruses it may contain. The allow list paradigm is thus inherently conservative, resolving ambiguity in the content item under investigation by assessing the content item as unsafe.

In addition to the use of the allow list, the strategies described herein can apply various rules that are predicated on the use of the allow list, e.g., that work in conjunction with the use of allow list. For example, the rules can act to prevent persons with malicious intent from developing code that acts to dupe a straightforward application of the allow list paradigm. Some of these rules may define prohibitions on permissible content, and therefore expressly act to exclude identified patterns (and therefore do not per se have the positive filtering characteristics of the allow list).

The strategies described herein confer a number of benefits. According to one benefit, the use of an allow list (which defines permissible patterns of behavior) is potentially more restrictive than the traditional case of a negative list (which describes known impermissible content). Security functionality predicated on the allow list paradigm (referred to as "conformance-checking functionality" herein) may therefore provide a more controlled (and potentially safer) environment in which to consume and propagate executable content in an IM application. At the same time, because the characteristics of an IM environment are relatively stable and well defined, the restrictions imposed by the allow list are not unduly restrictive.

According to another benefit, the conformance-checking functionality can act in conjunction with general purpose languages (such as traditional programming languages, scripting based languages, etc.) to provide effective security functionality in an efficient manner. That is, the use of a general purpose language is advantageous because it provides a development framework that many code developers are intimately familiar with, coupled with a rich collection of known features that developers may select from. The conformance-checking functionality integrates with this general purpose language by carving out a subset of permissible patterns within such a rich collection, to thereby enforce security constraints appropriate to a particular application environment (such as an instant messenger application environment). In this sense, the conformance-checking functionality acts as filter, allowing certain features (e.g., patterns of behavior) of the general purpose language, but not others. (The conformance-checking functionality can be configured to work in conjunction with only one type of general purpose programming language, or potentially multiple different types.) This approach is potentially superior to developing security functionality "from scratch" to address security concerns in a particular environment (that is, by building a special-purpose language with constraints "built into" it), because the "from scratch" approach is potentially more expensive, and may fail to advantageously exploit the content developers' prior learning experience with known general purpose commercial languages. (Nevertheless, the conformance-checking functionality described herein can also work in conjunction with such custom environment-specific languages.)

Additional features and attendant benefits of the strategies will be set forth in this description. At the outset, it should be noted that the present invention is described in the exemplary context of an IM application, but is applicable to many other applications and environments.

As to terminology, the term "content" represents any kind of information expressed in any kind of format. The content may contain information that includes no executable component. This is typically the case, for instance, with image information that provides a static picture (e.g., which provides a static user icon tile for presentation in an IM application). Or the content may contain information that includes an executable component. The executable component can be formulated using any programming models, such as traditional programming languages (e.g., C++, Sun's Java, Microsoft's .NET, etc.), script-based languages (Macromedia's ActionScript, JavaScript, VB Script, Python, Perl, Tcl, Rexx, etc.), or other type of programming models. As described in the Background section, the downloading of content having an executable component is obviously of greater concern than content without such content, as the executable component can cause damage to computer devices that consume such content, and can cause global damage to a system as a whole if this content is widely propagated.

Wherever grammatically appropriate, the term "content item" is used to refer to a particular piece of content, such as a particular program.

There term "virus" or "malicious content" (which are used interchangeably herein) refer to any kind of content which can cause undesirable actions. Undesirable actions can cause damage to a computer's resources (e.g., files), cause inappropriate access to confidential information (e.g., through spyware-like provisions), activate unwanted user interface presentations or web resources, present the nuisance of unsolicited advertising material, and so forth.

This disclosure includes the following sections. Section A presents an exemplary system for reducing the risk that executable content will cause undesirable actions. Section B presents a flowchart which describes the operation of the system of Section A. Section C describes an exemplary computer environment for implementing aspects of the system of Section A.

A. Exemplary System (FIGS. 3-7)

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (and/or declarative content, e.g., markup language content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Exemplary Design Paradigm

Figure 3:
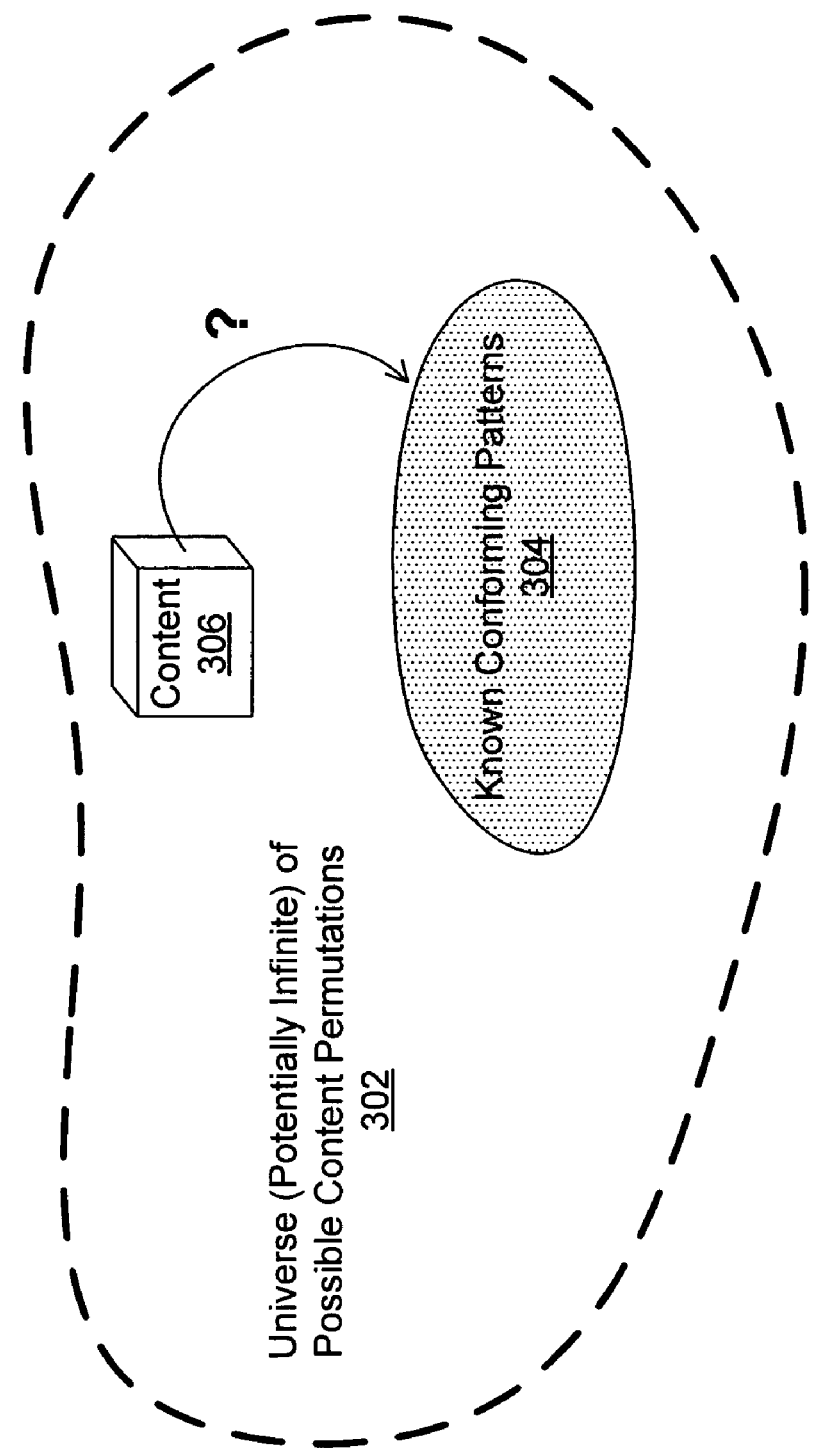
FIG. 3 is a diagram which illustrates an "allow list" paradigm which is used to govern the scanning of executable content according to the present invention.

FIG. 3 serves a vehicle for explaining a premise which is used to govern the scanning of executable content according to the present invention.

To begin with, a set 302 represents a possibly infinite number of executable content permutations. In other words, the set 302 represents different programs comprising different combinations of executable instructions to perform different associated functions. Most of the permutations in the set 302 represent non-malicious content, that is, permutations that do not intentionally or unintentionally invoke undesirable actions. But some of the permutations in this 302 do contain malicious content that will perform undesirable actions when executed. On the other hand, a subset 304 represents patterns of executable content that are known to perform no undesirable actions (or which have a low or otherwise acceptable risk of performing undesirable actions).

So-called "conforming-checking functionality" will be described herein which determines whether a particular piece of content 306 conforms to the subset 304 of known permitted patterns of behavior. This may be best understood by contrast with the traditional approach shown in FIG. 2. In that case, the conventional virus checker 210 examines the content item 212 against a knowledge base of known malicious content 206, as opposed to, in the case of FIG. 3, a knowledge base of permitted patterns of behavior. By virtue of this distinct and counterintuitive difference, the approach taken in the present invention can be referred to, loosely, as "inverse virus checking."

A.2. Overview of an Exemplary System for Performing Conformance-Checking

Figure 4:
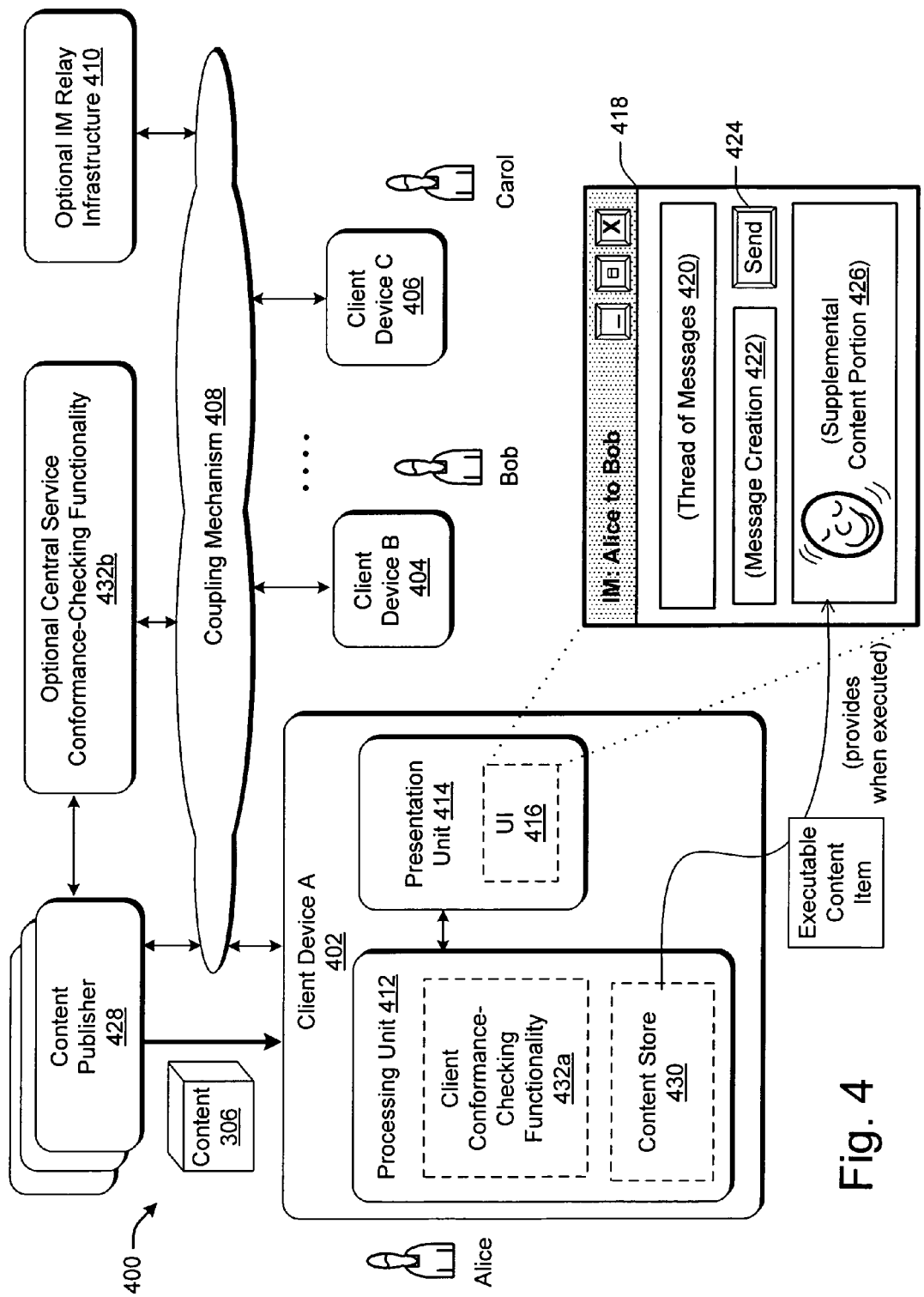
FIG. 4 shows an exemplary IM application which uses conformance-checking functionality, where the conformance checking functionality is designed, in part, based on the allow list paradigm set forth in FIG. 3.

FIG. 4 shows one exemplary and non-limiting system 400 that can be used to implement the conformance-checking paradigm summarized above. The system 400 includes a collection of client devices (402, 404, . . . 406) coupled together via a coupling mechanism 408. The system 400 can provide optional relay infrastructure 410 that includes functionality for enabling the devices (402, 404, . . . 406) to communicate with each other via the coupling mechanism 408. For instance, the relay infrastructure 410 can include optional switching mechanisms (e.g., switchboards) which establish a connection among two or more participants of an IM communication session.

The coupling mechanism 408 can comprise any mechanism or combination of mechanisms for coupling the components of the system 400 together. For instance, the coupling mechanism 406 can include any kind of network (or combination of networks), such as a wide area network (e.g., the Internet), an intranet, Digital Subscriber Line (DSL) network infrastructure, point-to-point coupling infrastructure, and so on. The coupling mechanism 408 can use or involve any kind of protocol or combination of protocols, such as the Internet Protocol (IP), the Transmission Control Protocol (TCP), the User Datagram Protocol (UDP), the HyperText Transfer Protocol (HTTP), the Simple Object Access Protocol (SOAP), and many potential others. In the case where one or more digital networks are used to disseminate information, the coupling mechanism 408 can include various hardwired and/or wireless links, routers, gateways, name servers, and so on (not shown).

In one case, the devices (402, 404, . . . 406) can communicate with each other via a peer-to-peer (P2P) arrangement, which may not require the services of relay infrastructure. In another case, the devices (402, 404, . . . 406) can communicate with each other via switchboard services and other functionality provided in the relay infrastructure 410. In another case, the devices (402, 404, . . . 406) can communicate with each other using a combination of P2P and switchboard services. If provided, the relay infrastructure 410 can comprise any combination of equipment for providing services to the client devices (402, 404, . . . 406). For instance, the relay infrastructure 410 can comprise one or more server machines (e.g., a server farm) for providing services to the devices (402, 404, . . . 406), as well as one or more associated databases, and so forth. The components of the relay infrastructure 410 can be located at a single site or distributed over plural sites.

Each client device (402, 404, . . . 406) can include any kind of equipment for interacting with other components of the system 400. In one exemplary case, the client devices (402, 404, . . . 406) can correspond to personal computer devices, personal digital assistant (PDA) devices, intelligent mobile phone devices, any kind of transportable or wearable computer device, any kind of game console device (such as Microsoft Corporation's Xbox™ game consoles), and so forth. Where the client devices (402, 404, . . . 406) are implemented by some kind of computer device, FIG. 9, to be discussed below in turn, provides one exemplary computer environment for implementing such device. In the illustrative case of FIG. 4, the user Alice (A) interacts with client device A 402, user Bob (B) interacts with client device B 404, and user Carol (C) interacts with client device C 406.

FIG. 4 shows that representative client device A 402 includes a processing unit 412 coupled to a presentation unit 414. The processing unit 412 comprises any data processing functionality for performing various ascribed tasks (such as one or more CPUs which execute machine-readable instructions), while the presentation unit 414 provides any kind of output mechanism by which a user (i.e., Alice) can interact with the processing unit 412. The presentation unit 414 can provide visual output, audio output, tactile output, any combination of such outputs, and so forth.

The presentation unit 416 can present various user interface (UI) presentations 416. In an IM application, for instance, one such UI presentation is a dialog pane 418. In the exemplary case of FIG. 4, the pane 418 indicates that the user Alice is conversing with the user Bob. A typical dialog pane 418 includes a message log box 420 which provides a record of the messages exchanged in the course of an ongoing conversation. The dialog pane 418 also includes a message creation box 422 for composing a message prior to transmission to a target recipient. The dialog pane 418 also includes a send command button 424 that prompts the IM application to transmit the message in the message creation box 422 to the target recipient, whereupon this message will appear in the message log box 420.

Finally, the dialog pane 418 can include a supplemental content portion 426. The supplemental content portion 426 can provide static content (which does not change) or dynamic content (which does change). In the case of dynamic content, such content can include animated icons, video vignettes, and so forth. FIG. 4 shows an exemplary supplemental content portion 426 that comprises an animated face that changes expression in the course of an IM conversation. The appearance, behavior, and position of the supplemental content portion 426 shown in FIG. 4 is merely representative; in fact, the supplemental content portion 426 can have any visual characteristics and dynamic behavior, and can appear anywhere in the dialog pane 418. For example, the supplemental content portion 426 can even be presented so as to momentarily obscure other portions of the dialog pane 418.

Executable content that implements the supplemental content portion 426 of the dialog pane 418 can originate from one or more content publishers. Assume, for the purposes of discussion, that the content that supplies the supplemental content portion 426 originates from a particular content publisher 428. Namely, the content publisher 428 can distribute content 306 in response to the user's (i.e., Alice's) payment of a fee, or in response to a non-fee event. (The content publisher 428 is referred to as a "third party" in the sense that it is neither the provider of the IM application itself nor the client user.) Alice's client device A 402 can store the content 306 in a content store 430 upon receipt. In the course of a communication session, Alice's client device A 402 can transfer the content 306 to another client device (404, . . . 406), such as to the content store (not shown) of Bob's client's device 404. (In another scenario, Alice could herself receive the content 306 from another IM participant, or she herself could conceivably create this content 306 using appropriate authoring tools.)

As mentioned above, a principal objective of the system 400 is to ensure that the content 306 downloaded from a content publisher 428 (or received from some other source) does not contain malicious content. To this end, the system provides conformance-checking functionality (432a, 432b).

Namely, in one scenario, the system 400 provides conformance-checking functionality 432a at each client device (402, 404, . . . 406). For instance, Alice's client device 402 includes client conformance-checking functionality 432a. The purpose of the client conformance-checking functionality 432a is to scan newly received content 306 to determine if it can be reasonably concluded that it is free of malicious content. If the client conformance-checking functionality 432a determines that the content 306 is free of malicious content, then this functionality 432a can authorize the local consumption of the content 306 at Alice's client device A 402. When Alice transfers the content 306 to Bob, Bob's client device B 404 makes an independent determination regarding the safety of the content 306 before executing it using its own conformance-checking functionality 432a (not shown).

In a second scenario, the system 400 provides central conformance-checking functionality 432b which is accessible to multiple IM participants. For instance, prior to consumption, Alice's client device 402 can consult with the central conformance-checking functionality 432b to determine if the content 306 is safe to use. This can involve Alice's client device A 402 transmitting a copy of the content 306 to the central conformance-checking functionality 432b, and receiving a pass/fail type response from the central conformance-checking functionality 432b. Other client devices (404, . . . 406) can perform the same operations upon their receipt of the content 306 from Alice's client device A 402. Various security provisions can be added to this embodiment to prevent this process from being subverted to malicious ends. For example, the central conformance-checking functionality 432b and client devices (402, 404, . . . 406) can use a secured communication channel (e.g., using SSL encryption or a form of public-private key pair encryption mechanism) when communicating with each other to provide assurances that a malicious entity has not somehow "hijacked" the transaction.

In a third scenario, the system 400 can use a combination of the client conformance-checking functionality 432a and the central conformance-checking functionality 432b. For example, the system 400 can rely on the client conformance-checking functionality 432a to perform preliminary processing on the content 306. If this processing indicates a relatively clear "pass" (indicating that the content 306 is clearly conforming), then the content 306 can be consumed. If, however, this processing indicates a fail, then the client conformance-checking functionality 432a can defer to the central conformance-checking functionality 432b. The central conformance-checking functionality 432b potentially has more update-to-date rules and/or more sophisticated analysis engines to examine the content 306. If the central conformance-checking functionality 432b confirms that the content 306 is non-conforming, then the system 400 will prohibit the consumption of the content 306. But if the central conformance-checking functionality 432b indicates that the content 306 is conforming, then this decision can override the fail-decision of the client conformance-checking functionality 432a. In another hybrid situation, the central conformance-checking functionality 432b can be consulted when the client conformance-checking functionality 432a is disabled or defective in any way. For example, the system 400 could use the central conformance-checking functionality 432b when it is determined that the client conformance-checking functionality is completely absent (e.g., is not installed), out of date (e.g., does not correspond to the current version), and so forth. In still another hybrid situation, when the system 400 detects that it is under attack by a fast-spreading virus, it can potentially rely on the central conformance-checking functionality 432b to provide more stringent safeguards (as well as safeguards that are under the full control of the entity that administers the system 400).

There are potential advantages and disadvantages to performing security-related processing at the local level, as well as potential advantages and disadvantages to performing security-related processing at the central level. Performing processing at the local level is potentially quicker than performing processing at the central level (e.g., because the local-level processing does not require network communication). But, for local processing, it may be more difficult to ensure that each client device's deployed database of conforming patterns and associated rules is up-to-date (compared to the case of central processing). The hybrid solution (combining both local processing and central processing) presents a combination of the above-described advantages and disadvantages.

In any of the above cases, the conformance-checking functionality (432a, 432b) can continually modify its database of known conforming patterns and associated rules based on the detection of conforming and non-conforming content 306. This updating can use manual techniques, automatic techniques, or a combination of manual and automatic techniques.

The next subsection (A.3) provides additional details regarding the conformance-checking functionality (432a, 432b). Henceforth, the conformance-checking functionality (432a, 432b) will be generically referred to as "conformance-checking functionality 432," with the understanding that reference is thereby being made to the client conformance-checking functionality 432a, or the central conformance-checking functionality 432b, or a combination of the client conformance-checking functionality 432a and the central conformance-checking functionality 432b.

A.3. Exemplary Conformance-Checking Functionality

Figure 5:
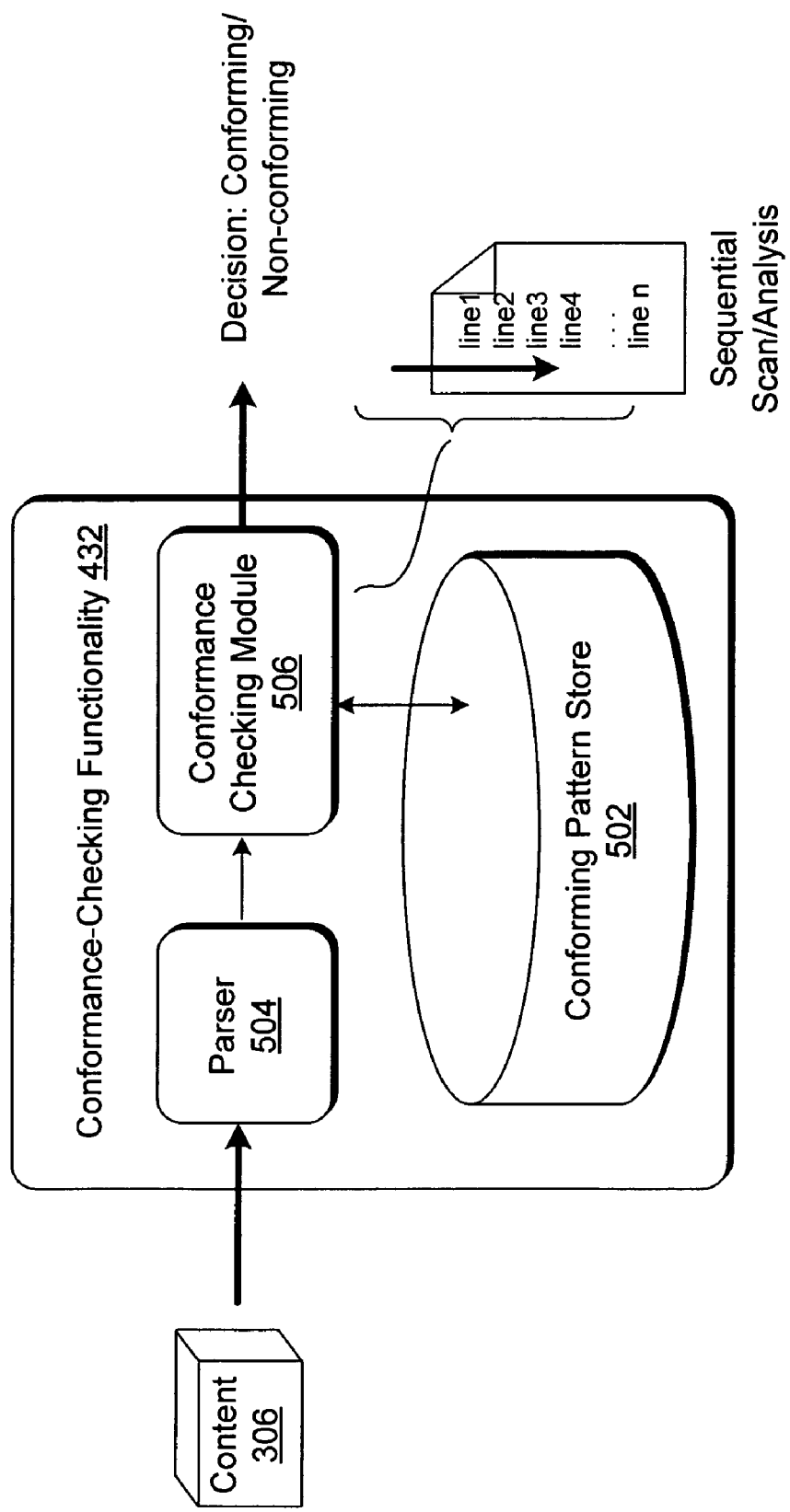
FIG. 5 is a more detailed depiction of the exemplary conformance-checking functionality of FIG. 4.
Figure 7:
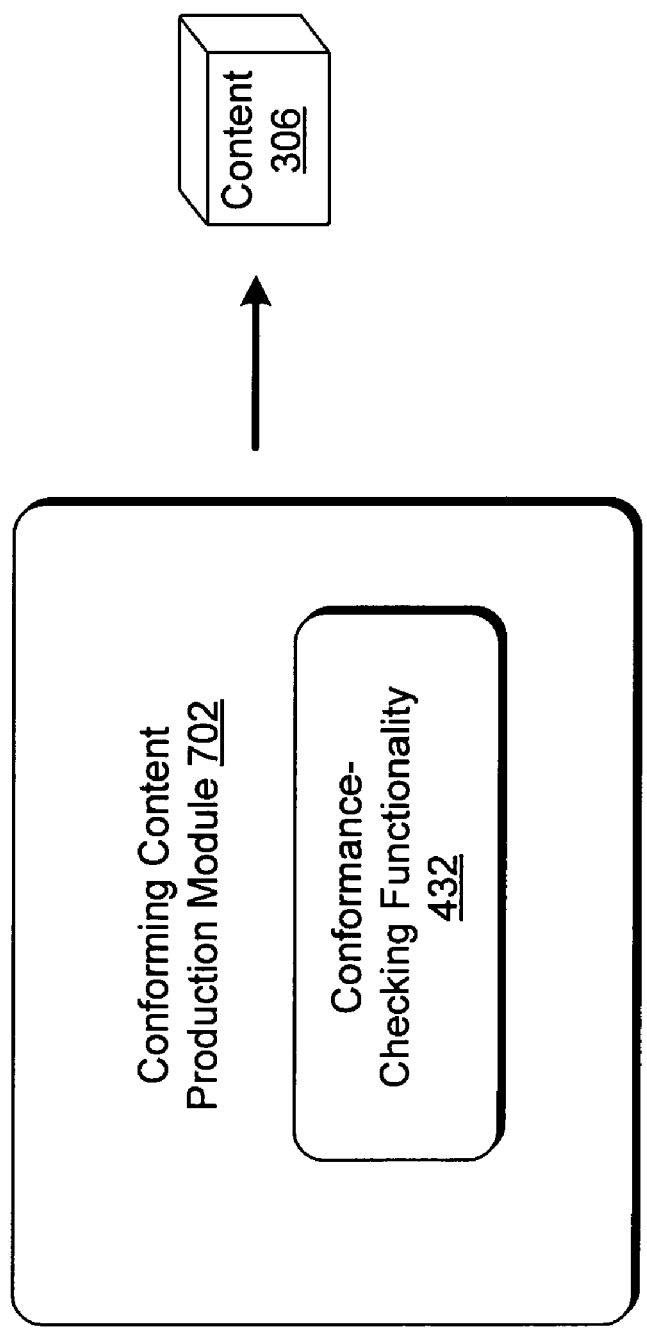
FIG. 7 shows exemplary production functionality that uses the conformance-checking functionality of FIGS. 4 and 5.

FIG. 5 shows a more detailed depiction of the conformance-checking functionality 432. The conformance-checking functionality 432 receives executable content 306, performs processing on the content 306, and, on the basis of this processing, generates a conclusion as to whether the content 306 is unlikely to perform undesirable actions.

To begin with, the content 306 being processed may represent code expressed in any format, such as script-based instructions, binary code, and so forth. (The content 306 that is analyzed can represent compiled code, uncompiled code, a combination of compiled code and uncompiled code, and so forth.) In the exemplary and non-limiting case where content 306 comprises a Flash program, the content 306 can include Flash Action opcodes which represent Flash actions. Whatever format is used to implement the content 306, instructions can appear in the content 306 in a defined sequential order. In one mode of operation, the conformance-checking functionality 432 processes the content 306 by analyzing its instructions in this sequential order, e.g., by scanning and analyzing the instructions from top to bottom, bottom to top, and so forth. FIG. 5 graphically represents this sequential processing by an arrow extending downward through a series of sequentially-arranged instructions (depicted at the right-hand portion of FIG. 5).

The conformance-checking functionality 432 includes a conforming pattern store 502. The conforming pattern store 502 forms a knowledge base of known acceptable patterns of behavior. In other words, these patterns of behavior comprise code patterns that have been determined in advance to have a high likelihood of not containing malicious content. The term "pattern" should be construed broadly as used herein. In a first case, a pattern of acceptable behavior can comprise specific instructions that invoke one or more functions that have been determined to be acceptable. In another case, a pattern of acceptable behavior comprises specific telltale sequences of instructions that have been determined to be acceptable. In general, in the context of an IM application, acceptable patterns of behavior are more likely to relate to the straightforward presentation of animation features, rather than functions which solicit user input, access local system resources, invoke web resources, and so forth. For example, acceptable presentation-related operations may include computations used to determine the behavior of the presentation (for example, computations that control the behavior of any kind of dynamic display object, such as moving clouds, changing facial expressions of a UI character, and so forth). In the specific exemplary context of the processing of Flash script, the processing performed by the conformance-checking functionality 432 can take the form of sequentially matching the information in the content 306 to byte patterns stored in the conforming pattern store 502.

In greater detail, the conformance-checking functionality 432 can include a parser 504. The parser 504 parses the content 306 into examinable portions for processing. The specific function of the parser 504 depends on the nature of the content 306 that it is being processing. In general, the examinable units identified by the parser 504 can correspond to any division of information in the content 306, such as separate routines, groups of instructions, single instructions, parts of instructions, and so forth. In the exemplary and non-limiting case of Flash technology, the parser 504 can break the content up into individual tag elements or action elements. A tag element represents the highest level organizational unit in a Flash file (*.swf); tags represent definitions and instructions (or groups of definitions and instructions). An action element represents opcodes that can exist in particular tag elements that represent compiled script.

Finally, a conformance-checking module 506 performs the task of comparing the examinable elements identified by the parser 504 with the patterns registered in the conforming pattern store 502. In one representative exemplary case, assume that a particular environment only permits functions having respective function names A, B, C, D and E. Consider the case of content 306 which includes an instruction sequence of "Push C" followed by "CallMethod." These instructions have the effect of pushing the name of function C to an instruction stack (such as the Action Stack in Flash Technology), and subsequently calling (invoking) this function. Since function C is on the allowed list of functions stored in the conforming pattern store 502, then the conformance checking module 506 would indicate that this sequence is acceptable. Now consider the case where the content 306 includes an instruction sequence of "Push F" followed by "CallMethod." These instructions have the effect of pushing the name of function F to the instruction stack, and then calling this function. Since function F is not on the allowed list of functions stored in the conforming pattern store 502, then the conformance checking module 506 would indicate that this sequence is non-conforming.

Because the conformance-checking functionality 432 makes decisions based on a limited set of allowed patterns, it takes a conservative approach to judging the safety of content 306. In other words, the conformance-checking functionality 432 may reject a particular content item as nonconforming, when it actually contains no instructions that will cause harmful actions. In this sense, the conformance-checking functionality 432 can be said to deal with any ambiguity by disallowing the content. This paradigm may present some limitations if applied to a multi-purpose online environment, where the content originates from different sources and is used in conjunction with a variety of different end-user applications. However, the IM application (and other narrowly-tailored applications) presents an environment with reasonably predictable and consistent demands and expectations. The conservative and non-intuitive approach embodied in the allow list paradigm does not present an unreasonably restrictive constraint in this type of environment.

Parsing and analyzing with the parser 504 and the conformance-checking module 506, respectively, can proceed in piecemeal fashion. That is, a first examinable element can be identified (by the parser 504) and then analyzed (by the conformance-checking module 506), following by a second examinable element, and so on. Or the content 306 can be entirely dissected (by the parser 506) and then its pieces can be analyzed (by the conformance-checking module 506).

Code that passes the above-described conformance-checking test can be consumed by the client device (402, 404, . . . 406) which initiated the test. Different applications can implement this feature in different ways. In one case, content 306 that passes the test can be stored in a pass cache (not shown). A key can be assigned to the passing content, and this key can be used to safely retrieve the content from the pass cache for execution. As mentioned above, when the content 306 is forwarded to another IM participant, that participant's client device should repeat the above conformance-checking test before executing it.

It is contemplated that a person with malicious intent may attempt to dupe the conformance-checking functionality 432 in various ways to override the allow list paradigm. To prevent such attacks, the conformance-checking functionality 432 includes supplemental rules that disallow patterns that are indicative of these kinds of attacks. The application of some of these rules act to prohibit certain types of behavior, and therefore do not themselves follow the allow list motif. Nevertheless, these negative rules (e.g., "do not do" rules) act in conjunction with the allow list paradigm, and therefore, viewed from a more encompassing standpoint, are integrated with this approach.

FIG. 6 lays out three examples of prohibitions that prevent various attacks on the allow list paradigm. In these examples, the function name "Good" is representative of a function that does not cause an undesirable action. The function name "Bad" is representative of a function that may cause an undesirable action (or may not cause an undesirable action). More specifically, the malicious nature of the function "Bad" cannot be determined, since the conformance-checking functionality 432 makes its decision with respect to a list of patterns that are allowed, not a list of patterns that are disallowed.

In scenario A, a first instruction pushes "B" onto the stack, followed a second instruction which pushes "ad" onto the stack. A third instruction, AddString, acts to combine the "B" and "ad" entries in the stack to produce "Bad." Finally, a CallMethod instruction invokes the "Bad" function, causing the invocation of a potentially malicious operation. The conformance-checking functionality 432 processes these instructions in the sequence in which they appear. This series of instruction does not include the typical sequence in which a function is pushed on the stack and then immediately invoked. And because of this anomalous characteristic, the conformance-checking functionality 432 may have difficulty properly rejecting this pattern of instructions. Therefore, to prevent this type of attack, the conformance-checking functionality 432 additionally mandates that all function calls must be immediately preceded by a push to the stack.

In scenario B, a first instruction pushes the function name "Bad" onto the stack. A second instruction instructs the executing device to jump to the fourth instruction. A third instruction pushes the function name "Good" onto the stack. A fourth instruction invokes the function pushed to the stack. During execution, the first instruction will push "Bad" to the stack, followed by invocation of the CallMethod instruction; this will have the effect of invoking the "Bad" function.

Again, the conformance-checking functionality 432 processes these instructions in sequence. It will note that the "Good" is pushed to the stack (in instruction 3) followed by the invocation of that function (in instruction 4), and therefore may be duped into thinking that this code pattern is safe (when in fact it may not be safe). To prevent this type of attack, the conformance-checking functionality 432 additionally disallows branching commands ("if" commands, "jump" commands, etc.) that branch to a CallMethod.

In scenario C, a first instruction pushes the function name "Good" onto the stack. A second instruction specifies that the function name "Good" is a variable, meaning that it can be redefined. A third function pushes the function name "Bad" onto the stack. A fourth instruction redefines the function name Good as Bad. A fifth instruction again pushes the function name "Good" to the stack. A final instruction invokes the function pushed to the stack using the CallMethod operation. Again, instructions 5 and 6 appear to have the permissible construction of a push to the stack of an allowed function, followed by the immediate invocation of that function. However, as per the preceding instructions, Good has been defined as Bad, so this CallMethod instruction has the effect of invocating the Bad function. To prevent this type of attack, the conformance-checking functionality 432 additionally prevents reassigning names from the allow list. In the specific content of the example of scenario C, this prohibitions states that no GetVariable instruction can be called with an entry from the allow list.

In the above discussion, the conformance-checking functionality 432 served the purpose of checking content 306 that had already been produced. However, as demonstrated in FIG. 7, the conformance-checking functionality 432 can also be used during the production of the content 306 to ensure, in advance, that the content 306 conforms to permitted patterns. Namely, as shown in that figure, conforming content production module 702 (referred to simply as a "production module" 702) includes the conformance-checking functionality 432 as an integral part thereof.

The conformance-checking functionality 432 can be applied within the production module 702 in various ways. For example, the conformance-checking functionality 432 can serve as a type of debugger which determines, after the content 306 has been produced (or after a part of it has been produced) whether it conforms to permitted expectations. Alternatively, or in addition, in those instances where the production module 702 can automatically generate content 306 (or parts of the content 306), the conformance-checking functionality 432 can be used to ensure that the code so produced is in conformity with permitted patterns.

As a final topic, the above discussion assumed that the conformance-checking functionality 432 applied the same set of rules and patterns to every consumption-related test. But, in another implementation, the conformance-checking functionality 432 can provide multiple levels of tests, such as a high risk test regimen, a medium risk test regimen, and a low risk test regimen. These different test regiments can apply different levels of permissiveness in defining what constitutes acceptable content. A software author, system administrator, or end user can configure the conformance-checking functionality 432 so that it uses a selected level of testing, or the conformance-checking functionality 432 can automatically select a level of testing depending on its independent assessment of the nature of content 306 that is being scanned. For example, content that originates from a trusted partner may receive a less stringent review than content received from an unknown entity, and so forth. Or different types of content items may be inherently more risky than others, e.g., because their characteristics present more vulnerabilities to a hacker's attack. More risky content types may warrant a more stringent level of permissiveness than other content types, or may warrant a more thorough (or complex) analysis regimen, and so forth. Or the system 400 can automatically trigger a high risk test regimen when it globally detects that a virus is spreading through the system 400.

B. Exemplary Method of Operation (FIG. 8)

Figure 8:
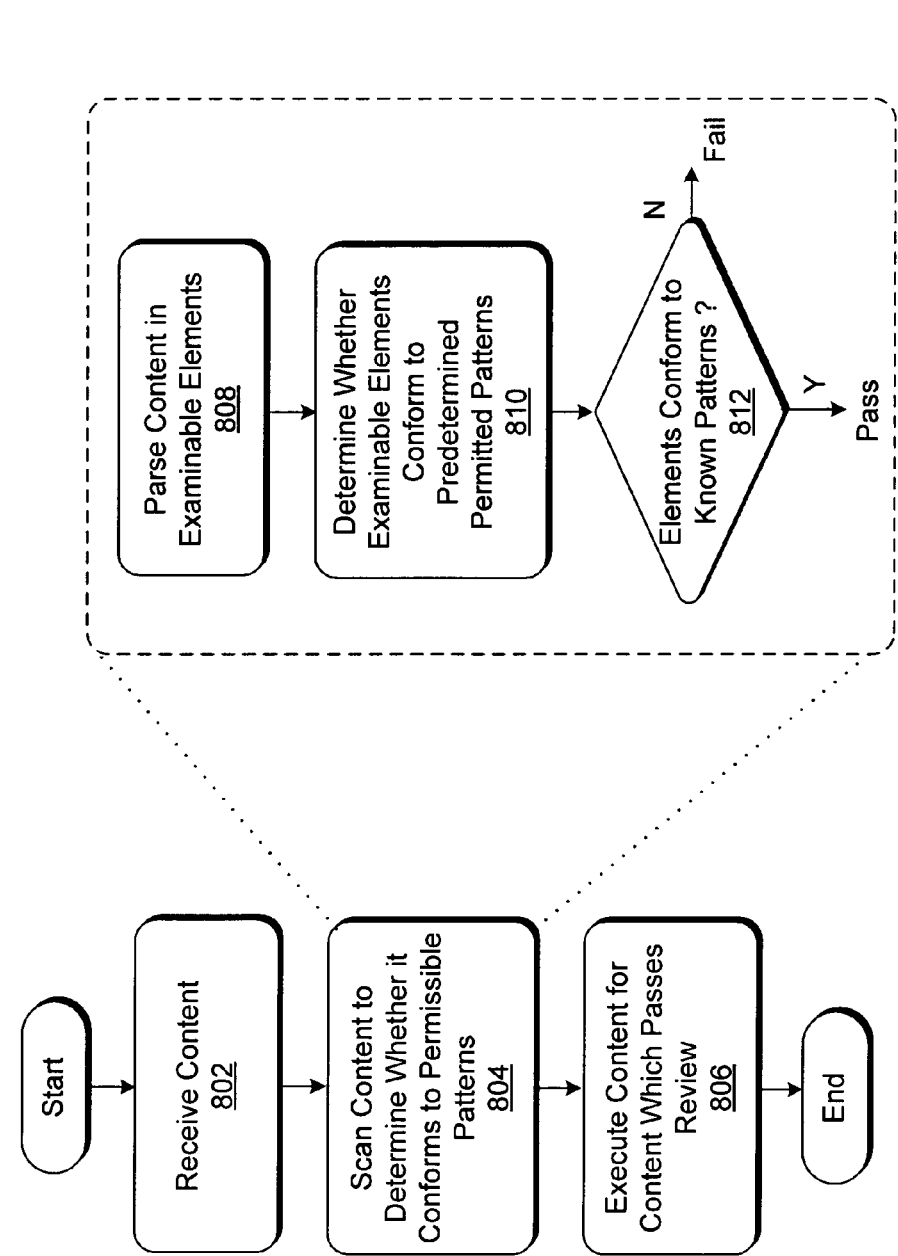
FIG. 8 shows a procedure which illustrates an exemplary manner of operation of the IM application of FIG. 4.

FIG. 8 describes the operation of the conformity-checking scheme in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the functions performed by conformity-checking scheme have already been explained in full in prior sections, this section will serve primarily as a review of those functions.

The left portion of FIG. 8 presents an overview of the conformance-checking approach. In step 802, the conformance-checking functionality 432 receives the content 306 to be scanned. In step 804, the conformance-checking functionality 432 scans the content 306 to determine whether it conforms to pre-established permissible content (as opposed to scanning it for predetermined known viruses). In step 806, the client device (402, 404, . . . 406) is permitted to execute the content 306 providing that it passes the conformity test in the preceding step (804).

The right portion of FIG. 8 expands on the processing performed in step 804. Namely, in step 808, the conformance-checking functionality 432 parses the content 306 into examinable elements (e.g., Flash tags, actions, and so forth). In step 810, the conformance-checking functionality 432 determines whether each examinable element conforms to predetermined patterns of behavior. This operation thus has the effect of determining whether each examinable element is present on the allow list stored in the conforming pattern store 502. This operation may also invoke various rules that work in conjunction with the allow list to prevent a hacker from duping the conformance-checking functionality 432 (as described in connection with FIG. 6). These rules may act to prohibit certain sequences of instructions, and therefore do not per se embody the allow list paradigm, but rather, facilitate the operation of the allow list paradigm. In step 812, the conformance-checking functionality 432 determines, for each examinable element in the content 306, whether it conforms to permissible patterns. If all of the content is deemed safe (because all of its component elements are deemed safe), the client device (402, 404, . . . 406) is free to execute the content 306.

Figure 9:
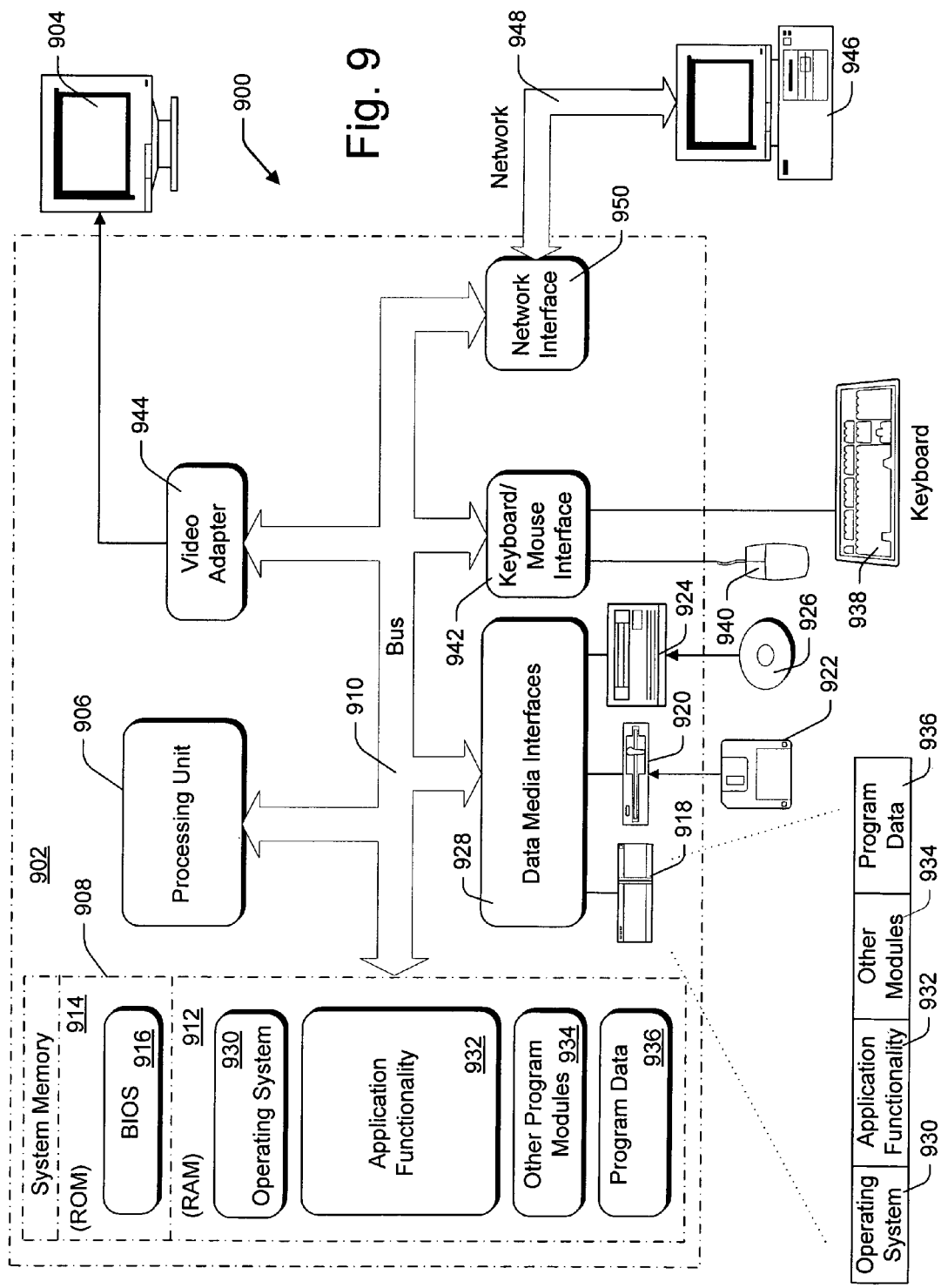
FIG. 9 shows an exemplary computer environment for implementing aspects of the IM application of FIG. 4.

C. Exemplary Computer Environment (FIG. 9)

In one exemplary implementation, certain aspects of the conformance-checking functionality 432 can be implemented as computer code executed by one or more computer devices. For example, the client conformance-checking functionality 432*a* can be implemented using the respective client devices (402, 404, . . . 406). Further, the central conformance-checking functionality 432*b* can be implemented using one or more server-type computers. In these cases, FIG. 9 provides information regarding an exemplary computer environment 900 that can be used to implement any such computer-based implementations of the conformance-checking functionality 432.

The computing environment 900 includes a general purpose or sever type computer 902 and a display device 904. However, the computing environment 900 can include other kinds of computing equipment. For example, although not shown, the computer environment 900 can include hand-held or laptop devices, set top boxes, game consoles, mainframe computers, etc. Further, FIG. 9 shows elements of the computer environment 900 grouped together to facilitate discussion. However, the computing environment 900 can employ a distributed processing configuration. In a distributed computing environment, computing resources can be physically dispersed throughout the environment.

Exemplary computer 902 includes one or more processors or processing units 906, a system memory 908, and a bus 910. The bus 910 connects various system components together. For instance, the bus 910 connects the processor 906 to the system memory 908. The bus 910 can be implemented using any kind of bus structure or combination of bus structures, including a memory bus or memory controller, a peripheral bus, an accelerated graphics port, and a processor or local bus using any of a variety of bus architectures.

Computer 902 can also include a variety of computer readable media, including a variety of types of volatile and non-volatile media, each of which can be removable or non-removable. For example, system memory 908 includes computer readable media in the form of volatile memory, such as random access memory (RAM) 912, and non-volatile memory, such as read only memory (ROM) 914. ROM 914 includes an input/output system (BIOS) 916 that contains the basic routines that help to transfer information between elements within computer 902, such as during start-up. RAM 912 typically contains data and/or program modules in a form that can be quickly accessed by processing unit 906.

Other kinds of computer storage media include a hard disk drive 918 for reading from and writing to a non-removable, non-volatile magnetic media, a magnetic disk drive 920 for reading from and writing to a removable, non-volatile magnetic disk 922 (e.g., a "floppy disk"), and an optical disk drive 924 for reading from and/or writing to a removable, non-volatile optical disk 926 such as a CD-ROM, DVD-ROM, or other optical media. The hard disk drive 918, magnetic disk drive 920, and optical disk drive 924 are each connected to the system bus 910 by one or more data media interfaces 928. Alternatively, the hard disk drive 918, magnetic disk drive 920, and optical disk drive 924 can be connected to the system bus 910 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 930, application-specific functionality 932 (including functionality for implementing aspects of the conformance-checking methodology), other program modules 934, and program data 936. In the specific context of an IM application, the conformance-checking functionality 432 can be implemented as an integral part of the IM application code, or as a distinct utility (e.g., a distinct command line utility).

The computer environment 900 can include a variety of input devices. For instance, the computer environment 900 includes the keyboard 938 and a pointing device 940 (e.g., a "mouse") for entering commands and information into computer 902. The computer environment 900 can include other input devices (not illustrated), such as a microphone, joystick, game pad, satellite dish, serial port, scanner, card reading devices, digital or video camera, etc. Input/output interfaces 942 couple the input devices to the processing unit 906. More generally, input devices can be coupled to the computer 902 through any kind of interface and bus structures, such as a parallel port, serial port, game port, universal serial bus (USB) port, etc.

The computer environment 900 also includes the display device 904. A video adapter 944 couples the display device 904 to the bus 910. In addition to the display device 904, the computer environment 900 can include other output peripheral devices, such as speakers (not shown), a printer (not shown), etc.

Computer 902 operates in a networked environment using logical connections to one or more remote computers, such as a remote computing device 946. The remote computing device 946 can comprise any kind of computer equipment, including a general purpose personal computer, portable computer, a server, etc. Remote computing device 946 can include all of the features discussed above with respect to computer 902, or some subset thereof.

Any type of network 948 can be used to couple the computer 902 with remote computing device 946, such as the WAN 402 of FIG. 4, a LAN, etc. The computer 902 couples to the network 948 via network interface 950 (e.g., the interface 416 shown in FIG. 4), which can utilize broadband connectivity, modem connectivity, DSL connectivity, or other connection strategy. Although not illustrated, the computing environment 900 can provide wireless communication functionality for connecting computer 902 with remote computing device 946 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for communicating using an instant messaging application, the method comprising:
   storing, in a memory communicatively coupled to a processor, computer-executable instructions for performing the method;
   executing the instructions on the processor;
   according to the instructions being executed:
   receiving executable content by a client device, wherein the executable content contains sequential instructions;
   determining, with reference to a knowledge base of predetermined permissible patterns of behavior, whether the executable content is unlikely to perform undesirable actions and whether the sequential instructions satisfy prescribed rules;
   accessing an allow list comprising executable content determined to be unlikely to perform undesirable actions, and therefore comprising passing executable content, wherein each passing executable content has an assigned key; and
   using a key of passing executable content to retrieve the passing executable content from the allow list for execution on the client device; and
   using the passing executable content in an instant messaging communication session.

2. The method of claim 1, wherein one of the prescribed rules mandate that a method call command must be preceded by a stack push command.

3. The method of claim 1, wherein one of the prescribed rules mandates that no branching command can branch to a method call command.

4. The method of claim 1, wherein one of the prescribed rules mandates that a variable cannot be defined as an entry in the predetermined permissible patterns of behavior.

5. One or more machine-readable devices containing machine readable instructions defined on optical, magnetic and/or flash memory media for implementing the method of claim 1.

6. The method of claim 1, the method additionally comprising:
receiving supplemental content for use with the executable content, wherein the supplemental content is acquired from a third party;
separating the executable content into individual tag elements and action elements, wherein a tag element represents an organizational unit and represents a definition, instruction, or group of definitions or instructions, and wherein an action element represents opcodes that exist in a particular tag element and represents compiled script; and
implementing, by the executable content, the supplemental content.

7. A method for reducing risk that executable content performs undesirable actions, the method comprising:
storing, in a memory communicatively coupled to a processor, computer-executable instructions for performing the method;
executing the instructions on the processor;
according to the instructions being executed:
receiving executable content; and
determining, with reference to a knowledge base of predetermined permissible patterns of behavior, whether the executable content, parsed into examinable elements, is unlikely to perform undesirable actions, the determining performed by:
receiving, from a code checking entity that is remote from a client device, an indication of whether each examinable element is unlikely to perform undesirable actions;
accessing an allow list comprising passing examinable elements that are determined unlikely to perform undesirable actions, each passing examinable element having an assigned key; and
using a key of a passing examinable element to retrieve the passing examinable element from the allow list for execution on the client device.

8. The method of claim 7, wherein the executable content comprises instructions expressed in a script-based language.

9. The method of claim 7, wherein the executable content comprises a program for execution in the context of an instant messaging application.

10. The method of claim 7, wherein portions of the determining are performed at the client device, if the client device is capable of performing the portions of the determining, prior to execution of the executable content by the client device.

11. The method of claim 7, wherein the executable content contains sequential instructions, and wherein the determining comprises ascertaining whether the sequential instructions satisfy prescribed rules.

12. The method of claim 11, wherein one of the prescribed rules mandate that a method call command must be preceded by a stack push command.

13. The method of claim 11, wherein one of the prescribed rules mandates that no branching command can branch to a method call command.

14. The method of claim 11, wherein one of the prescribed rules mandates that a variable cannot be defined as an entry in the predetermined permissible patterns of behavior.

15. One or more machine-readable devices containing machine readable instructions defined on optical, magnetic and/or flash memory media for implementing the method of claim 7.

16. The method of claim 7, the method additionally comprising:
receiving supplemental content for use with the executable content, wherein the supplemental content is acquired from a third party;
determining, with reference to the knowledge base of predetermined permissible patterns of behavior, whether the supplemental content is unlikely to perform undesirable actions; and
implementing, by the executable content, the supplemental content.

17. The method of claim 7, wherein parsing of the executable content into examinable elements comprises separating the executable content into individual tag elements and action elements, wherein a tag element represents an organizational unit and represents a definition, instruction, or group of definitions or instructions, and wherein an action element represents opcodes that exist in a particular tag element and represents compiled script.

18. Conformance-checking functionality for reducing the risk that executable content performs undesirable actions, the functionality comprising:
logic, stored in a computer-readable memory, configured to receive the executable content, wherein the executable content contains sequential instructions; and
logic configured to cause a computing device to:
determine, with reference to a knowledge base of predetermined permissible patterns of behavior, whether the executable content is unlikely to perform undesirable actions;
ascertain, with reference to the knowledge base, whether the sequential instructions satisfy prescribed rules;
access a pass cache comprising passing content elements that are determined unlikely to perform undesirable actions, each passing content element having an assigned key; and
use a key of a passinq content element to retrieve the passing content element from the pass cache for execution on the client device.

19. One or more machine-readable devices containing machine readable instructions defined on optical, magnetic and/or flash memory media for implementing the conformance-checking functionality of claim 18.

* * * * *

UNITED STATES PATENT AND TRADEMARK OFFICE
CERTIFICATE OF CORRECTION

| | | |
|---|---|---|
| PATENT NO. | : 8,037,534 B2 | Page 1 of 1 |
| APPLICATION NO. | : 11/069797 | |
| DATED | : October 11, 2011 | |
| INVENTOR(S) | : Joseph B. Smith et al. | |

It is certified that error appears in the above-identified patent and that said Letters Patent is hereby corrected as shown below:

In column 18, line 52, in Claim 18, delete "passinq" and insert -- passing --, therefor.

Signed and Sealed this
Sixth Day of December, 2011

David J. Kappos
*Director of the United States Patent and Trademark Office*